United States Patent
Chalstrom et al.

(10) Patent No.: US 7,170,624 B2
(45) Date of Patent: Jan. 30, 2007

(54) SYSTEM AND METHOD FOR ADVERTISING

(75) Inventors: Robert Eugene Chalstrom, Fort Collins, CO (US); Timothy L. Goldstein, Loveland, CO (US); Mike A. Farrell, Fort Collins, CO (US); Gregory A. Brake, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 10/176,853

(22) Filed: Jun. 20, 2002
(Under 37 CFR 1.47)

(65) Prior Publication Data
US 2003/0234955 A1 Dec. 25, 2003

(51) Int. Cl.
*G09G 5/00* (2006.01)
*G06F 15/00* (2006.01)

(52) U.S. Cl. .................. 358/1.15; 345/2.1; 345/2.2; 345/2.3; 715/867; 709/206

(58) Field of Classification Search ............... 358/1.5, 358/1.15, 1.16, 1.18, 1.12, 1.13; 399/2, 3; 709/206; 705/16, 17, 21, 27; 345/2.1–2.3; 715/867
See application file for complete search history.

(56) References Cited

U.S. PATENT DOCUMENTS

| | | | | |
|---|---|---|---|---|
| 5,513,254 A * | 4/1996 | Markowitz | ............. | 379/100.17 |
| 6,404,994 B1 * | 6/2002 | Kawai et al. | ............. | 399/6 |
| 6,424,426 B1 * | 7/2002 | Henry | ............. | 358/1.15 |
| 6,493,717 B1 * | 12/2002 | Junkin | ............. | 707/102 |
| 6,583,799 B1 * | 6/2003 | Manolis et al. | ............. | 715/838 |
| 6,655,284 B1 * | 12/2003 | Hoshii et al. | ............. | 101/484 |
| 6,705,781 B2 * | 3/2004 | Iwazaki | ............. | 400/62 |
| 6,853,461 B1 * | 2/2005 | Shiimori | ............. | 358/1.15 |
| 6,862,107 B1 * | 3/2005 | Kawai | ............. | 358/1.18 |
| 6,880,169 B1 * | 4/2005 | Watanabe et al. | ............. | 725/113 |
| 6,892,223 B1 * | 5/2005 | Kawabata et al. | ............. | 709/213 |
| 6,943,866 B2 * | 9/2005 | Redd et al. | ............. | 355/40 |
| 6,961,710 B1 * | 11/2005 | Yanagisawa et al. | ............. | 705/24 |
| 6,965,447 B2 * | 11/2005 | Satake et al. | ............. | 358/1.15 |
| 6,990,498 B2 * | 1/2006 | Fenton et al. | ............. | 707/102 |
| 7,019,856 B2 * | 3/2006 | Kawabata | ............. | 358/1.15 |
| 7,031,288 B2 * | 4/2006 | Ogier | ............. | 370/338 |
| 7,054,937 B1 * | 5/2006 | Milne et al. | ............. | 709/227 |

* cited by examiner

*Primary Examiner*—Douglas Q. Tran
*Assistant Examiner*—Chan S. Park

(57) ABSTRACT

The present disclosure relates to a system and method for advertising. In one arrangement, the system and method pertain to receiving data to be printed via a network, configuring the data for printing on a print medium, printing the data on the print medium, and printing advertising material on the print medium in addition to the data to be printed.

14 Claims, 6 Drawing Sheets

SYSTEM AND METHOD FOR ADVERTISING

FIELD OF THE INVENTION

The present disclosure relates to a system and method for advertising. More particularly, the disclosure relates to a system and method for advertising via a wide area network such as the Internet.

BACKGROUND OF THE INVENTION

Recently, many new devices have been introduced in the market that are capable of connection to the Internet without the need of another device such as a personal computer (PC). Normally, users of such devices pay Internet service providers (ISPs) for access to the Internet. For instance, users of handheld devices such as personal digital assistants (PDAs) and mobile telephones can obtain limited access to information on the Internet if the users pay a monthly service fee. It is currently expected that such access will soon be extended to other network-enabled devices such as multi-function peripheral (MFP) devices and other such network-enabled appliances.

Where a user has a PC and one or more other network-enabled devices, the user may need to pay several separate access fees to obtain Internet access with each of the devices. The reason for this typically is due to the fact that different ISPs provide access for the different devices. Although it would be possible for a single ISP to extend access for all of a user's devices (e.g., a PC as well as other network-enabled devices) in exchange for a single all-inclusive access fee, ISPs that provide service to PC users are reluctant to serve the network-enabled device market in that it is more difficult to generate collateral revenue in this market. Specifically, due to the limitations of the network-enabled devices, it is difficult to present the user with third party advertising materials. Additionally, many owners of network-enabled devices are hesitant to access the Internet with these devices in that they often do not wish to pay separate fees beyond those already paid for PC access to the Internet.

SUMMARY OF THE INVENTION

From the foregoing, it can be appreciated that it would be desirable to have a system and method for advertising in relation to access of the Internet with network-enabled devices.

The present disclosure provides such a system and method. In one arrangement, the system and method pertain to receiving data to be printed via a network, configuring the data for printing on a print medium, printing the data on the print medium, and printing advertising material on the print medium in addition to the data to be printed.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
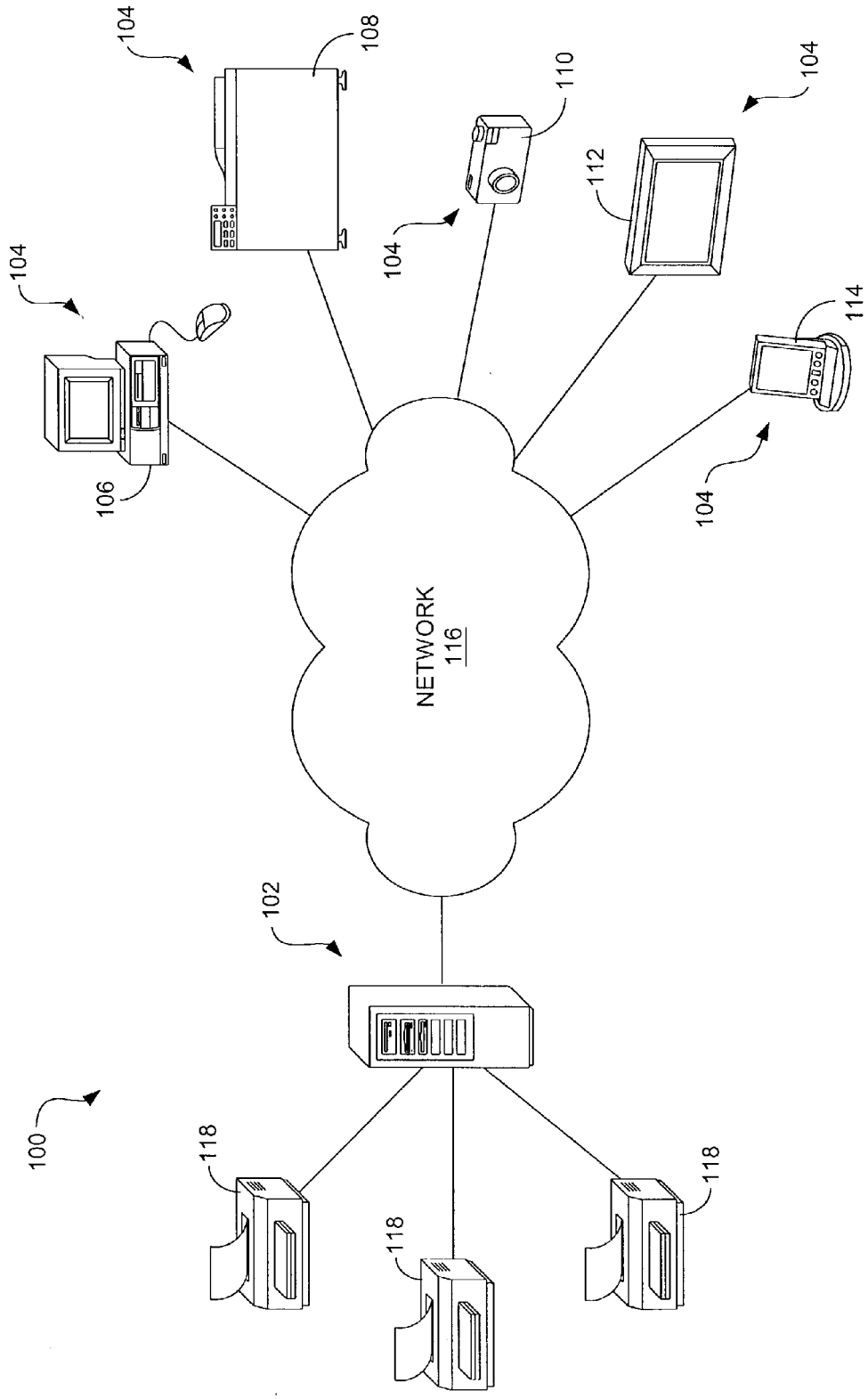
FIG. 1 is a schematic view of an example system for advertising according to the teachings of the present invention.

Referring now in more detail to the drawings, in which like numerals indicate corresponding parts throughout the several views, FIG. 1 illustrates an example system 100 for advertising. As indicated in this figure, the system 100 generally comprises a network server 102 and one or more network-enabled devices 104. The network-enabled devices 104 can take many different forms. By way of example, these devices 104 can be configured as a computer such as a personal computer (PC) 106 or a personal digital assistant (PDA) 114. Alternatively, the devices 104 can be configured as a network appliance such as a multi-functional peripheral (MFP) device 108, a digital camera 110 (still or video), a digital picture frame 112, etc. As will be apparent from this disclosure when taken as a whole, the nature of the network-enabled devices 104 is not critical to the invention. Indeed, as will be understood from the discussion that follows, the network-enabled devices 104 can comprise substantially any device or appliance that is capable of connecting to a network and which may include some form of user interface (e.g., display) with which advertisements can be communicated to the user.

As is further indicated in FIG. 1, each of the network server 102 and the network-enabled devices 104 is connected to a network 116. The network 116 can comprise one or more sub-networks that are communicatively coupled to each other. By way of example, these networks can include one or more local area networks (LANs) and/or wide area networks (WANs). Typically, however, the network 104 comprises a set of networks that forms part of the Internet. The system 100 further comprises printers 118 that, as indicated in FIG. 1, are connected to the network server 102. Although direct connection to the printers 118 is depicted in FIG. 1, it is to be understood that the connection can be indirect and, for instance, facilitated by a further network (not shown). Moreover, although the system 100 is depicted as including these printers 118, it will be appreciated from this disclosure that these printers are optional and therefore not necessary to the disclosed invention. When provided, the printers preferably comprise high resolution printers that are adapted to print photograph quality prints, typically on high quality photograph paper.

Figure 2:
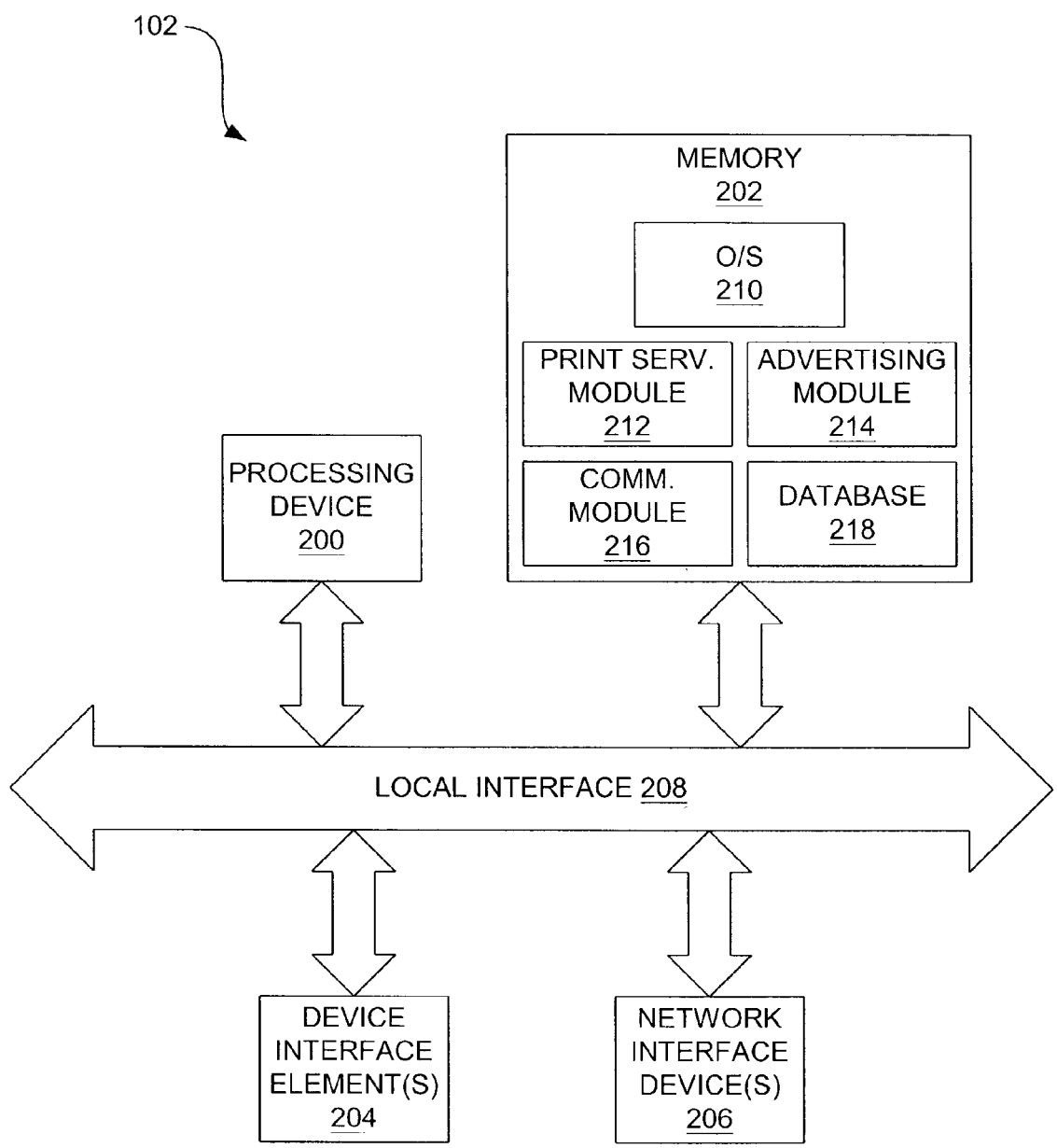
FIG. 2 is a schematic view of a network server shown in FIG. 1.

FIG. 2 is a schematic view illustrating an example architecture for the network server 102 shown in FIG. 1. As indicated in FIG. 2, the network server 102 can comprise a processing device 200, memory 202, one or more device interface elements 204, one or more network interface devices 206, and a local interface 208 to which each of the other components electrically connects. The local interface 208 may have additional elements, which are omitted for simplicity, such as controllers, buffers (caches), drivers, repeaters, and receivers to enable communications. Furthermore, the local interface 208 may include address, control, and/or data connections to enable appropriate communications among the aforementioned components.

The processing device 200 can include any custom made or commercially available processor, a central processing unit (CPU) or an auxiliary processor among several processors associated with the network server 102, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more device interface elements 204 typically comprise the hardware used to electrically connect the network server 102 with another device, such as a printer 118, so that data can be sent and received between the server and the other device. Therefore, by way of example, the device interface elements 204 can comprise one or more external buses and/or communication ports. Although such interface elements 204 are normally provided, it is to be appreciated that they are not necessary where the network server 102 communicates with the printers 118 through a further network. The one or more network interface devices 206 comprise the hardware with which the network server 102 transmits and receives information over the network 116, and printer network where provided. By way of example, the network interface devices 206 include components that communicate both inputs and outputs, for instance, a modulator/demodulator (e.g., modem), a radio frequency (RF) or other transceiver, a telephonic interface, a bridge, a router, etc.

The memory 202 comprises various software programs including an operating system 210, a print service module 212, advertising module 214, and a communications module 216. The operating system 210 controls the execution of other software, such as the advertising module 214, and provides scheduling, input-output control, file and data management, memory management, and communication control and related services. The print service module 212 can comprise one or more applications (e.g., executable programs) that facilitate the operation of a network-based printing service as well as any printer drivers needed to communicate with the printers 118.

The advertising module 214 preferably comprises software that enables the distribution of advertising material to users of the network-based service. For example, as discussed in greater detail below with reference to FIGS. 4–5, the advertising module 214 can be configured to facilitate the printing of advertising material on hardcopy prints (i.e., printer printouts) to be distributed to a user and/or transmit advertising material for display on a network-enabled device 104 operated by the user. The communications module 216, in conjunction with the network interface devices 206, facilitates network communications for the network server 102. In addition to the aforementioned software, the memory 202 typically comprises a database 218 that can be used to store advertising material that will be distributed to the user in some manner.

Figure 3:
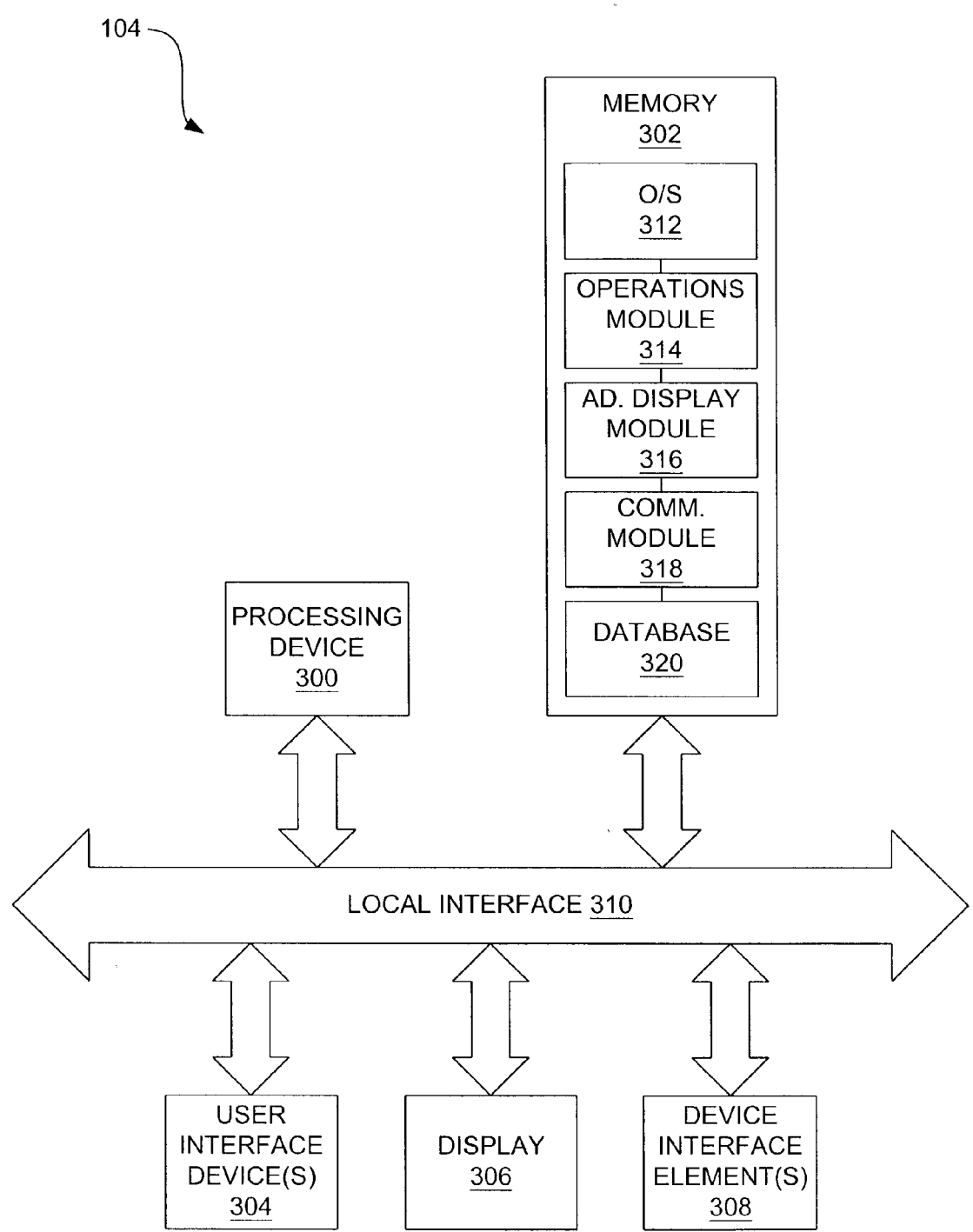
FIG. 3 is a schematic view of network-enabled devices shown in FIG. 1.

FIG. 3 is a schematic view illustrating an example architecture for the network-enabled devices 104 shown in FIG. 1. As identified above, the particular nature of each network-enabled device 104 can vary from device to device. Generally speaking, however, each network-enabled device 104 typically comprises a processing device 300, memory 302, one or more user interface devices 304, a display 306, and one or more network interface devices 308. Each of these components is connected to a local interface 310 that, by way of example, comprises one or more internal buses. The processing device 300 is adapted to execute commands stored in memory 302 and can comprise a general-purpose processor, a microprocessor, one or more application-specific integrated circuits (ASICs), a plurality of suitably configured digital logic gates, and other well-known electrical configurations comprised of discrete elements both individually and in various combinations to coordinate the overall operation of the network-enabled device 104.

The one or more user interface devices 304 typically comprise interface tools with which the device settings can be changed and through which the user can communicate commands to the network-enabled device 104. By way of example, where the network-enabled device 104 comprises a PC, these interface devices 304 may comprise a keyboard and mouse. Where the network-enabled device 104 comprises a peripheral device or appliance (e.g., MFP device), the user interface devices 304 can comprise one or more function keys with which the operation of the network-enabled device 104 can be controlled. Where the network-enabled device comprises a PDA, the user interface devices 304 may further include a touch-sensitive screen.

Irrespective of the precise nature of the network-enabled device 104, the display 306 is adapted to communicate graphical information to the user, such as advertising material, and can comprise a monitor, liquid crystal display (LCD), light emitting diode (LED) display, or substantially any other type of display screen with which information can be communicated to the user. The one or more network interface devices 308 are adapted to facilitate connection to the network 116 and, like the network interface devices 206, can include components that communicate both inputs and outputs, for instance, a modulator/demodulator (e.g., modem), a radio frequency (RF) or other transceiver, a telephonic interface, a bridge, a router, etc.

The memory 302 includes various software and/or firmware programs including an operating system 312, an operations module 314, an advertising display module 318, and a communications module 318. The operating system 312 contains the various commands used to control the general operation of the network-enabled device 104. The operations module 314 comprises software and/or firmware that includes various applications that are adapted to satisfy various intended functionalities appurtenant to the network 116 for which the network-enabled device 104 is configured. For example, the operations module 314 can include a browser application that is used to access the network 116, a transmission (e.g., email or facsimile) application that is used to transmit data to a desired destination via the network, an upload application that is used to upload images to the network, a download application that is used to download images from the network, etc. The advertising display module 316 is used to facilitate the display of advertising materials to the user on the display 306. The operation of the advertising module 316 is described below with reference to FIG. 6. The communications module 318 is configured to, in conjunction with the network interface devices 308, enable communications via the network 116. In addition, the memory 302 can include a database 320 which is used to, at least temporarily, store data (e.g., advertising material) within the network-enabled device 104.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Figure 4:
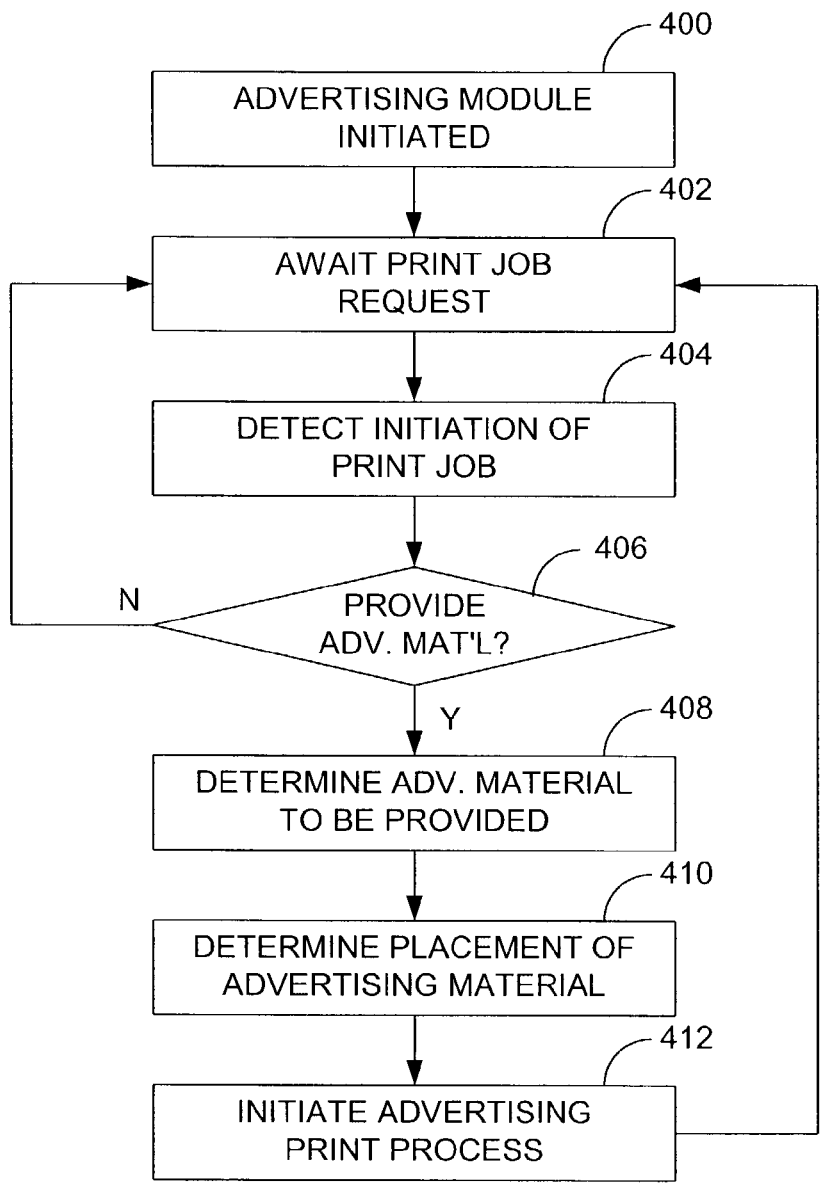
FIG. 4 is a flow diagram that illustrates a first example mode of operation of an advertising module shown in FIG. 2 according to the present invention.

FIG. 4 illustrates a first example mode of operation for the advertising module 214 of the network server 102. As indicated in block 400, the advertising module 214 is first initiated. By way of example, the advertising module 214 can comprise an application that operates in the background of printing services provided over the network 116. As identified above, the printing service, when provided, typically pertains to the printing of high quality images on high quality photograph paper. In such an arrangement, the network server 102 can be owned and operated by a printing service provider that receives digital images or documents from users (i.e., customers) via the network 116 and prints high quality hardcopies (i.e., prints) of the images for the users in exchange for a fee.

As indicated in block 402, once the advertising module 214 has been initiated the module awaits a print job request. The print job request can be generated in various ways. For example, the print job request can be generated by the user by uploading digital images to a web site operated by the service provider and placing an order for prints. Alternatively, the print job request can be generated by the service provider after a user order has been received. In any case, once such a request is made, flow continues to block 404 at which the advertising module 214 detects the print job request. Although the advertising module 214 is described herein as detecting the print job request, persons having ordinary skill in the art will appreciate that the advertising module can, alternatively, be configured for manual operation in which a service provider administrator manually activates the advertising module 214 when a print job is to be performed.

Next, flow continues to decision element 406 at which the advertising module 214 determines whether advertising material is to be provided to the user. This determination can be made with respect to various factors. For instance, whether the user is to be provided with advertising material can depend upon the service plan the user has with the service provider (if any), the amount of money the user has agreed to pay for the prints, demographic information concerning the user, etc. If advertising materials are not to be provided to the user for a particular print job, flow can return to block 402 at which point the advertising module 402 again awaits a print job request.

If, on the other hand, the user is to be provided with advertising material, flow continues to block 408 at which the advertising module 214 determines which advertising material is to be provided to the user. Again, this determination can depend upon several different factors such as demographic information concerning the user, the number of prints that the user has ordered, the number of duplicate copies the user has ordered, etc. Alternatively, the advertising material to be presented to the user can be selected by default, for example, one particular advertisement can be used for all print jobs completed during a particular week.

Generally speaking, the nature of the advertising material can widely vary. For instance, the advertising material can comprise discount offers on services (e.g., printing services) the service provider offers, advertising for products the service provider sells, discounts and/or advertising related to products and/or services third parties provide, and so forth. Irrespective of the particular nature of the advertising material, the service provider presumably derives some benefit from the advertising materials whether it be direct, e.g., revenue obtained from the third party for advertising its products and/or services, or indirect, e.g., interest generated for products and/or services the service provider offers.

Once the nature of the advertising material has been determined, flow continues to block 410 at which the placement of the advertising material can be determined. Normally, the advertising is printed on the reverse side of the prints so as not to detract from the aesthetics of the printed image or document. Therefore, the advertising module 214 can be configured such that the advertising material is provided on the reverse of one or more prints by default. Alternatively, however, where space is available on the front side of a print, e.g., in a blank border that surrounds an image, the advertising material can be placed on the front side of the print. When the advertising material is provided on the front side, the customer preferably can remove the advertising material by simply cropping the print in a manner that does not adversely affect the appearance of the print.

At this point, the advertising module 214 can initiate the advertising material print process, as indicated in block 412. This step can entail associating particular advertising material stored in the database 218 with one or more of the individual images and/or documents to be printed and sending this information, along with the designated location of the advertising material, to the print service module 212, which controls the printing process. Alternatively, this step can entail merely providing an indication to the print service module 212 that advertising material is to be added to the a particular print job. In any case, the printing of the advertising material can be controlled by the print service module 212 and facilitated by the printers 118 such that advertising material is added to one or more of the prints of the print job. Once the print job is completed, the prints, and therefore the associated advertising material, can be provided to the user by, for instance, mailing them to the user.

Figure 5:
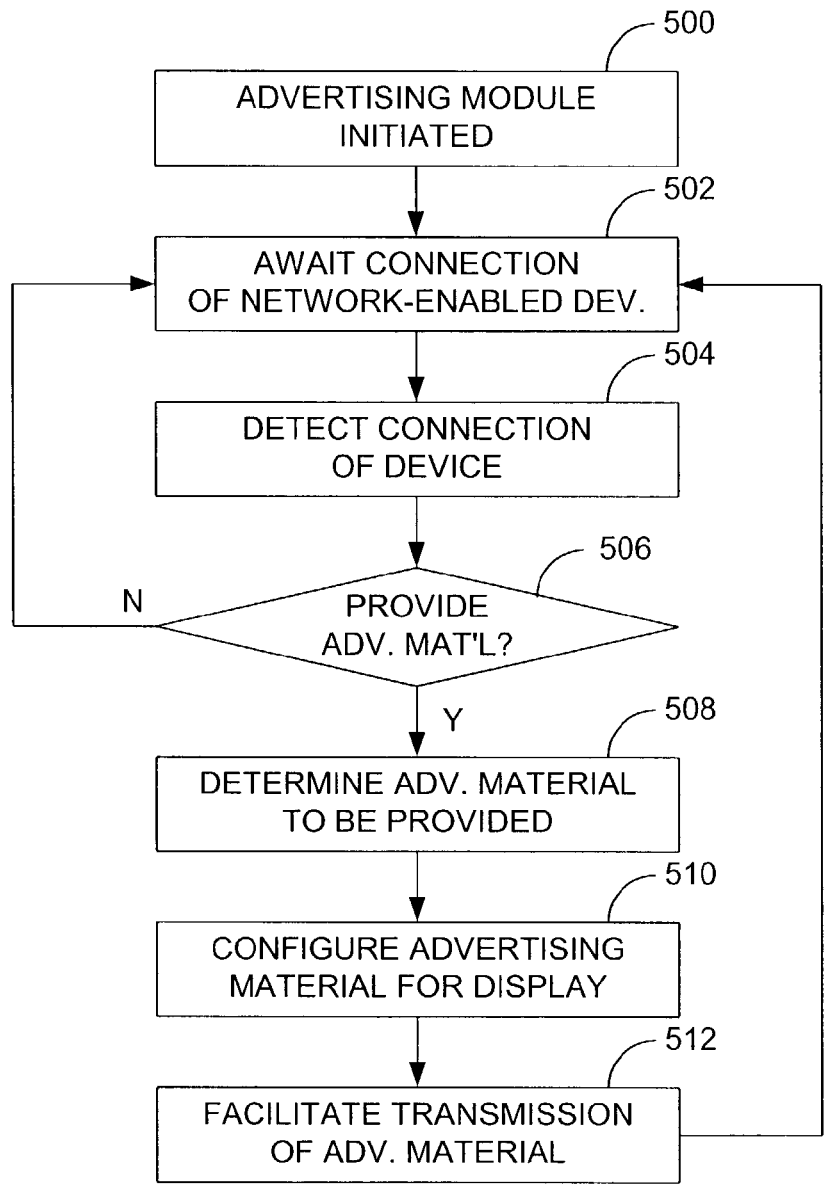
FIG. 5 is a flow diagram that illustrates a second example mode of operation of the advertising module shown in FIG. 2 according to the present invention.

Advertising materials can be provided to the customer in other ways. FIG. 5 illustrates a second example mode of operation for the advertising module 214 in which the advertising material is transmitted to the customer for display on the customer's network-enabled device 104. As indicated in block 500, the advertising module 214 is again first initiated. Once initiated, the advertising module 214 can await connection of a network-enabled device 104, as indicated in block 502, to the network server 102 or to another device on the network 116. In the latter case, the other device can be configured to alert the advertising module 214 that such connection has been made. By way of example, the connection (to either the network server 104 or other device) can result from a user accessing a particular web site with the PC 106, the user uploading one or more images from the digital camera 110 to an image repository, the retrieval of images by the digital picture frame 112 for viewing, the retrieval of information from the Internet with the PDA 114, etc. Once the connection has been made, the advertising module 214 can detect this connection, as indicated in block 504 and, as indicated in decision element 506, determine whether advertising material is to be provided to the user.

Again, the determination as to whether advertising material is to be provided can be made with respect to various factors such as those noted above with respect to the first example mode of operation. If advertising material is not to be provided to the user, flow can return to block 502 at which the advertising module 214 again awaits a device connection. If, on the other hand, the user is to be provided with advertising material, flow continues to block 508 at which the advertising module 214 determines which advertising material is to be provided to the user. Again, this material can, optionally, be selected by default. Once the nature of the advertising material has been determined, flow continues to block 510 at which the advertising material can be configured for display on the network-enabled device 104. The nature of the configuration depends upon how the advertising material is to be displayed to the user. For instance, the advertising material can be configured for display to the user on a "splash" screen that is shown on the display 306 when the device 104 first boots. Alternatively, the advertising material can be displayed to the user when the device 104 is working, for instance while data is being transmitted from or to the device. The configuration of the advertising material may further depend upon the nature of the network-enabled device 104. For instance, where the device 104 comprises a digital picture frame, the advertising material can be configured as a slide that is to be presented to the user in a slide show shown to the user with the frame. Persons having ordinary skill in the art will appreciate that many other display options exist.

Figure 6:
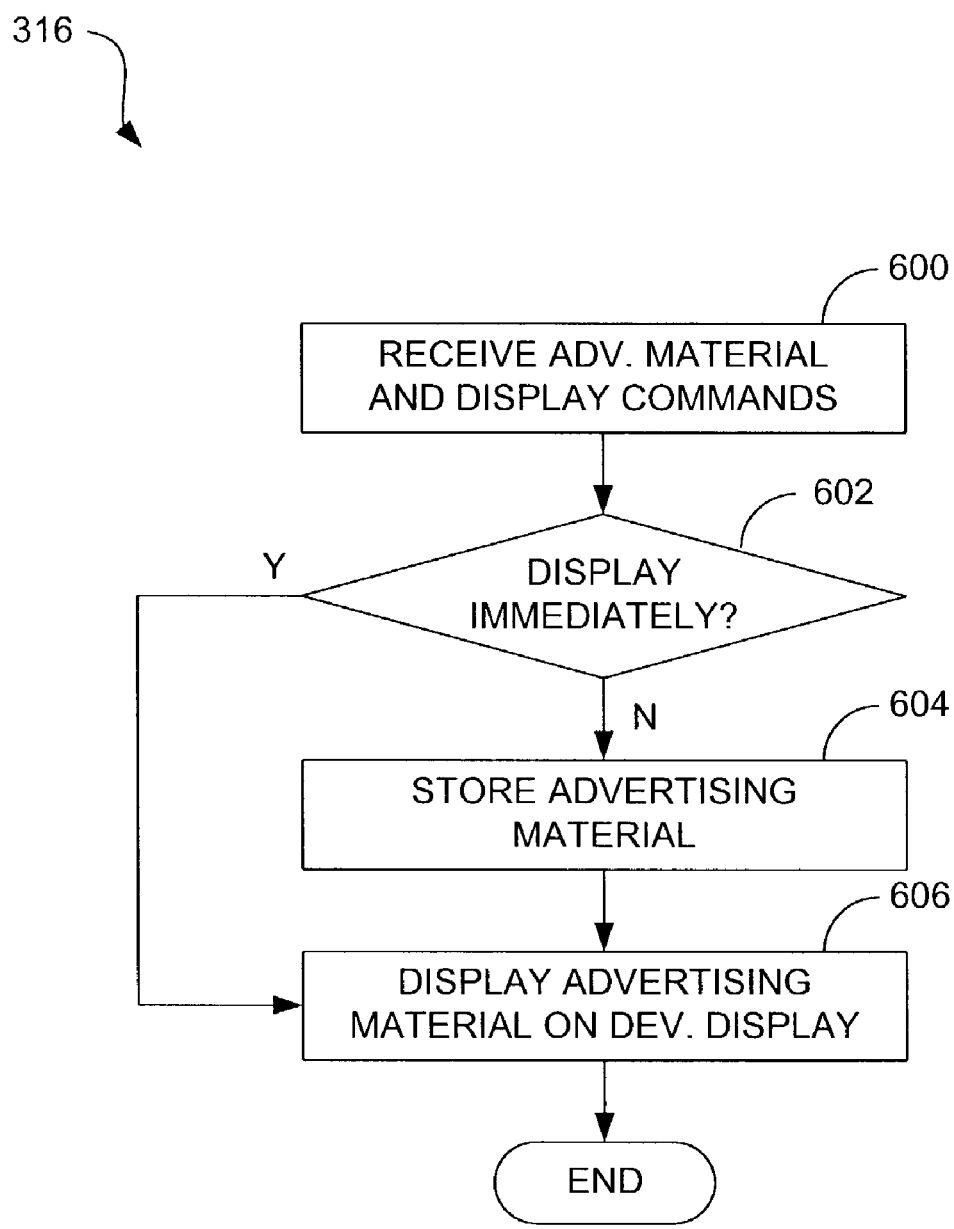
FIG. 6 is a flow diagram that illustrates operation of an advertising display module shown in FIG. 3 according to the present invention.

At this point, the advertising module 214 can facilitate transmission of the advertising material, as indicated in block 512, along with any related display commands. Once the advertising material is transmitted, it can be stored and/or displayed on the network-enabled device 104. FIG. 6 illustrates an example mode of operation of the advertising display module 316. As indicated in block 600 of this figure, the advertising display module 316 receives the advertising material and any commands associated with its display. Depending upon these commands, and therefore the manner in which the advertising material is to be presented to the user, the display module 316 can, as indicated in decision element 602, determine whether the advertising material is to be immediately displayed (e.g., as streaming graphical data) to the user or stored for later display to the user. If the advertising material is to be immediately displayed, flow continues down to block 606 and the advertising material is displayed to the user by the advertising display module 214 with the display 306. If the advertising material is to be displayed to the user at another time, however, flow continues to block 604 at which the material is stored for later use until, as indicated in block 606, it is time to display the advertising material. At this point, flow is, at least temporarily, terminated. Where the advertising material is stored, the advertising material can be configured for recurring display to the user. For instance, the advertising material can be displayed in response to a particular stimulus (e.g., booting of the device) until such time when it is replaced by new advertising material that is received when the network-enabled device 104 again is connected to the network 116.

What is claimed is:

1. A method for advertising, comprising:
downloading image data via a network from a network-enabled device to a server;
receiving from the server with the network-enabled device advertising material during the downloading;
storing the advertising material on the network-enabled device;
receiving instructions from the server with the network-enabled device as to when to display the advertising material;
displaying the advertising material in a display of the network-enabled device without a network browser at a display time after the downloading has been completed in accordance with the received instructions.

2. The method of claim 1, wherein the display time for the advertising material is during booting of the network-enabled device.

3. The method of claim 1, wherein the display time for the advertising material is during a slideshow presented by the network-enabled device.

4. The method of claim 3, wherein the advertising material is displayed as a slide of the slide show.

5. The method of claim 1 wherein the network comprises the Internet.

6. The method of claim 1 wherein the advertising material comprises graphical advertising material.

7. The method of claim 1, wherein the network-enabled device comprises a digital camera.

8. The method of claim 1, wherein the network-enabled device comprises a digital picture frame.

9. The method of claim 1, wherein the network-enabled device comprises a multifunction peripheral (MFP) device.

10. The method of claim 1, wherein the network-enabled device comprises a personal digital (PDA).

11. The method of claim 1, wherein the display time for the advertising material is during booting of the network-enabled device.

12. The method of claim 1, wherein the display time for the advertising material is during a slideshow presented by the network-enabled device.

13. The method of claim 3, wherein the advertising material is displayed as a slide of the slide show.

14. A network-enabled device, comprising:
means for downloading image data to a server;
means for receiving from the server advertising material during downloading of image data from the network-enabled device to the server;
means for storing the advertising material;
means for receiving instructions from the server as to when to display the advertising material;
means for displaying the advertising material in a display of the network-enabled device without use of a network browser at a display time after the downloading has occurred in accordance with the received instructions.

* * * * *

UNITED STATES PATENT AND TRADEMARK OFFICE
CERTIFICATE OF CORRECTION

| | | |
|---|---|---|
| PATENT NO. | : 7,170,624 B2 | Page 1 of 1 |
| APPLICATION NO. | : 10/176853 | |
| DATED | : January 30, 2007 | |
| INVENTOR(S) | : Chalstrom et al. | |

It is certified that error appears in the above-identified patent and that said Letters Patent is hereby corrected as shown below:

In column 8, line 33, in Claim 5, after "claim 1" insert -- . --.

In column 8, line 35, in Claim 6, after "claim 1" insert -- , --.

In column 8, line 44, in Claim 10, delete "method of claim 1," and insert -- network-enabled device of claim 14, --, therefor.

In column 8, line 45, in Claim 10, after "digital" insert -- assistant --.

In column 8, line 46, in Claim 11, delete "method of claim 1," and insert -- network-enabled device of claim 14, --, therefor.

In column 8, line 49, in Claim 12, delete "method of claim 1" and insert -- network-enabled device of claim 14, --, therefor.

In column 8, line 52, in Claim 13, delete "method of claim 3," and insert -- network-enabled device of claim 12, --, therefor.

Signed and Sealed this
Fourteenth Day of June, 2011

David J. Kappos
*Director of the United States Patent and Trademark Office*